United States Patent
Kohsaka et al.

(10) Patent No.: US 11,186,889 B2
(45) Date of Patent: Nov. 30, 2021

(54) HIGH-STRENGTH STEEL SHEET AND MANUFACTURING METHOD THEREFOR

(71) Applicant: JFE Steel Corporation, Tokyo (JP)

(72) Inventors: Noriaki Kohsaka, Tokyo (JP);
Michitaka Sakurai, Tokyo (JP);
Yoshikazu Suzuki, Tokyo (JP);
Yoshimasa Himei, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 562 days.

(21) Appl. No.: 16/320,328

(22) PCT Filed: Aug. 10, 2017

(86) PCT No.: PCT/JP2017/029036
§ 371 (c)(1),
(2) Date: Jan. 24, 2019

(87) PCT Pub. No.: WO2018/030502
PCT Pub. Date: Feb. 15, 2018

(65) Prior Publication Data
US 2020/0347473 A1    Nov. 5, 2020

(30) Foreign Application Priority Data

Aug. 10, 2016    (JP) .............................. JP2016-157760
Jul. 19, 2017    (JP) .............................. JP2017-139539

(51) Int. Cl.
| | | |
|---|---|---|
| *C21D 9/46* | (2006.01) | |
| *B32B 15/01* | (2006.01) | |
| *C21D 1/26* | (2006.01) | |
| *C21D 6/00* | (2006.01) | |
| *C21D 8/02* | (2006.01) | |
| *C22C 38/00* | (2006.01) | |
| *C22C 38/02* | (2006.01) | |
| *C22C 38/06* | (2006.01) | |
| *C22C 38/24* | (2006.01) | |
| *C22C 38/42* | (2006.01) | |
| *C22C 38/44* | (2006.01) | |
| *C22C 38/50* | (2006.01) | |
| *C22C 38/54* | (2006.01) | |
| *C22C 38/58* | (2006.01) | |
| *C23C 2/06* | (2006.01) | |
| *C23C 2/40* | (2006.01) | |

(52) U.S. Cl.
CPC .............. *C21D 9/46* (2013.01); *B32B 15/013* (2013.01); *C21D 1/26* (2013.01); *C21D 6/004* (2013.01); *C21D 6/005* (2013.01); *C21D 6/008* (2013.01); *C21D 8/0205* (2013.01); *C21D 8/0226* (2013.01); *C21D 8/0263* (2013.01); *C22C 38/001* (2013.01); *C22C 38/002* (2013.01); *C22C 38/02* (2013.01); *C22C 38/06* (2013.01); *C22C 38/24* (2013.01); *C22C 38/42* (2013.01); *C22C 38/44* (2013.01); *C22C 38/50* (2013.01); *C22C 38/54* (2013.01); *C22C 38/58* (2013.01); *C23C 2/06* (2013.01); *C23C 2/40* (2013.01); *C21D 2211/005* (2013.01); *C21D 2211/008* (2013.01)

(58) Field of Classification Search
None
See application file for complete search history.

(56) References Cited

U.S. PATENT DOCUMENTS

| | | | | |
|---|---|---|---|---|
| 8,137,487 | B2 * | 3/2012 | Nonaka | C21D 8/0426 148/603 |
| 9,650,708 | B2 * | 5/2017 | Becker | C21D 6/002 |
| 9,879,334 | B2 * | 1/2018 | Ueda | C22C 38/001 |

FOREIGN PATENT DOCUMENTS

| | | |
|---|---|---|
| CN | 103781932 A | 5/2014 |
| EP | 2371979 A | 10/2011 |
| EP | 2371979 A1 | 10/2011 |
| EP | 2730672 A1 | 5/2014 |
| EP | 3128026 A1 | 2/2017 |
| JP | 2005-256044 A | 9/2005 |
| JP | 2010-126770 A | 6/2010 |
| JP | 2011-052295 A | 3/2011 |
| JP | 2011-111670 A | 6/2011 |
| JP | 2012-031462 A | 2/2012 |
| JP | 2013-014822 A | 1/2013 |
| JP | 2013-060657 A | 4/2013 |

(Continued)

OTHER PUBLICATIONS

The Extended European Search Report dated Jul. 4, 2019, of counterpart European Application No. 17839569.5.
Office Action dated May 28, 2020, of counterpart Chinese Application No. 201780046410.1, along with an English Search Report.
Notice of Allowance dated Aug. 25, 2020, of Korean Application No. 10-2019-7002600, along with an English translation.

\* cited by examiner

*Primary Examiner* — Daniel J. Schleis
(74) *Attorney, Agent, or Firm* — DLA Piper LLP (US)

(57) ABSTRACT

A high-strength steel sheet contains, in mass %, C: 0.07 to 0.14%, Si: 0.65 to 1.65%, Mn: 1.8 to 2.6%, P: 0.05% or less, S: 0.005% or less, Al: 0.08% or less, N: 0.0060% or less, Ti: 0.005 to 0.030%, B: 0.0002 to 0.0030%, and either or both of Cr: 0.01 to 0.40% and Mo: 0.01 to 0.50% and satisfies the expression (1); where: an average grain size of a ferrite phase is 1.5 μm or less; an area ratio of the ferrite phase is 2% or more and 15% or less; an area ratio of a tempered martensite phase is 75% or more and 96% or less; and a total length per unit area of an interface between an untempered martensite phase and the ferrite phase and an interface between the untempered martensite phase and the tempered martensite phase is $6.3 \times 10^8$ μm/m$^2$ to $5.0 \times 10^{11}$ μm/m$^2$.

16 Claims, No Drawings

(56) References Cited

FOREIGN PATENT DOCUMENTS

| | | |
|---|---|---|
| JP | 2014-173151 A | 9/2014 |
| JP | 2015-117403 A | 6/2015 |
| KR | 10-2011-0067159 A | 6/2011 |
| KR | 2013-0110634 A | 10/2013 |
| WO | 2015/151428 A1 | 10/2015 |
| WO | 2016/067623 A1 | 5/2016 |

HIGH-STRENGTH STEEL SHEET AND MANUFACTURING METHOD THEREFOR

TECHNICAL FIELD

This disclosure relates to a high-strength steel sheet and a manufacturing method therefor.

BACKGROUND

In view of global environmental protection, the automotive industry as a whole has in recent years tried to improve automobile fuel efficiency for the purpose of controlled $CO_2$ emission. To improve automobile fuel efficiency, reduction in automobile weight through reducing the thickness of parts to be used is most effective. Accordingly, the use of high-strength steel sheets as raw materials for automotive parts has been increasing in recent years.

Meanwhile, formability of a steel sheet tends to deteriorate as strength increases. For this reason, a steel sheet having excellent formability, in addition to high strength, is desired. A steel sheet having unsatisfactory elongation is not applicable to automotive parts and the like due to defects such as cracks that arise during forming. To reduce weight of automotive parts and the like, development of a steel sheet having both high strength and satisfactory elongation is essential. Accordingly, various techniques focusing on satisfactory elongation have been proposed for a high-strength cold-rolled steel sheet and a hot-dip coating steel sheet.

For example, Japanese Unexamined Patent Application Publication No. 2005-256044 discloses that a high-strength cold-rolled steel sheet having excellent workability and corrosion resistance after painting is obtained by including, in mass %, C: 0.03 to 0.18%, Si: 0.01 to 1.5%, Mn: 0.5 to 3.0%, P: 0.001 to 0.1%, S: 0.0001 to 0.008%, sol. Al: 0.01 to 0.1%, and N: 0.0001 to 0.008%, with the balance substantially being Fe; by including a soft layer with a thickness of 10 to 100 μm and a ferrite volume ratio of 90% or more in the steel sheet surface layer; by ensuring a tempered martensite volume ratio of 30 to 80% in the central microstructure; and specifying a ratio of Si concentration in the ferrite phase to the tempered martensite phase.

Japanese Unexamined Patent Application Publication No. 2011-52295 discloses that a high-strength cold-rolled steel sheet having an excellent balance between elongation and stretch flangeability is obtained by ensuring a component composition containing, in mass %, C: 0.03 to 0.30%, Si: 0.1 to 3.0%, Mn: 0.1 to 5.0%, P: 0.1% or less, S: 0.1% or less, N: 0.01% or less, and Al: 0.01 to 1.00%, with the balance being Fe and incidental impurities; by ensuring a microstructure containing, in area ratio, 70% or more of tempered martensite having a hardness of higher than 380 HV and 450 HV or lower, with the balance being ferrite; and specifying particle size distribution of cementite particles in the tempered martensite.

Japanese Unexamined Patent Application Publication No. 2012-31462 discloses that a high-strength hot-dip galvanized steel sheet having excellent formability and impact resistance is obtained by having a composition containing, in mass %, C: 0.05 to 0.5%, Si: 0.01 to 2.5%, Mn: 0.5 to 3.5%, P: 0.003 to 0.100%, S: 0.02% or less, Al: 0.010 to 0.5%, B: 0.0002% to 0.005%, and Ti: 0.05% or less, with the balance being Fe and incidental impurities and Ti>4N being satisfied; and by having a microstructure containing, in area ratio, 60% or more and 95% or less of tempered martensite with an average grain size of 5 μm or less and 5% or more and 20% or less of retained austenite with an average grain size of 5 μm or less.

Japanese Unexamined Patent Application Publication No. 2015-117403 discloses that a high-strength hot-dip galvanized steel sheet having excellent impact resistance and bendability is obtained by ensuring a component composition containing, in mass %, C: more than 0.10% and less than 0.18%, Si: 0.01 to 1.00%, Mn: 1.5 to 4.0%, P: 0.100% or less, S: 0.020% or less, Al: 0.010 to 0.500%, Cr: 0.010 to 2.000%, Nb: 0.005 to 0.100%, Ti: 0.005 to 0.100%, and B: more than 0.0005% and 0.0030% or less, with the balance being Fe and incidental impurities; by ensuring a microstructure composed of, in area ratio, 0 to 10% of ferrite, 15 to 60% of martensite, 20 to 50% of tempered martensite, and 20 to 50% of bainitic ferrite, where each average crystal grain size of massive martensite, tempered martensite, and bainitic ferrite is 15 μm or less, a difference obtained by subtracting a tempered martensite area ratio from a bainitic ferrite area ratio is 20% or less, and an area ratio of martensite whose adjacent phases are solely martensite is 5% or less in accordance with the total martensite area ratio; and by specifying hardness of the surface layer microstructure.

The technique proposed in JP '044, however, causes unsatisfactory strength and bendability to be exhibited in some cases. In addition, the technique proposed in JP '044 obtains the intended microstructure by performing two-stage cooling at different cooling rates during annealing, and water cooling is required in the latter-stage cooling. Meanwhile, automotive parts and the like are desired to have good coating characteristics since these parts are used in a corrosive environment. JP '044, however, is not applicable to a hot-dip coating steel sheet since a steel sheet with water attached to the surface cannot be immersed in a coating bath.

The technique proposed in JP '295 requires controlling C whose diffusion rate is remarkably faster than substitutional elements, thereby controlling growth of cementite particles in the tempered martensite. JP '295, however, does not disclose a method of controlling grain size distribution, and thus implementation is considered to be impossible.

In the technique proposed in JP '462, the surface microstructure in the surface layer and in the central portion is not optimal for bendability. The retained austenite phase, in particular, is a microstructure of high ductility. Retained austenite, however, tends to undergo strain-induced transformation in its thickness-direction surface layers, which are subjected to extremely severe working, and the martensite phase after transformation adversely affects bendability in some cases.

In the technique proposed in JP '403, Nb is included, and Nb carbonitride adversely affects bendability in some cases. Moreover, bainitic ferrite and bainite increase the length of interfaces between iron with a soft bcc structure and hard cementite, thereby increasing the probability of microcracking during bending due to interfacial delamination between iron with a bcc structure and cementite.

It could therefore be helpful to provide a high-strength steel sheet having a tensile strength of 980 MPa or higher and good formability and a manufacturing method therefor.

SUMMARY

We thus provide:

[1] A high-strength steel sheet having a component composition containing, in mass %, C: 0.07 to 0.14%, Si: 0.65 to 1.65%, Mn: 1.8 to 2.6%, P: 0.05% or less, S: 0.005% or less, Al: 0.08% or less, N: 0.0060% or less, Ti: 0.005 to 0.030%, B: 0.0002 to 0.0030%, and either or both of Cr: 0.01 to 0.40% and Mo: 0.01 to 0.50%, with the balance being Fe and incidental impurities, Expression (1) being satisfied, where: an average grain size of a ferrite phase is 1.5 μm or less; an area ratio of the ferrite phase is 2% or more and 15% or less; an area ratio of a tempered martensite phase is 75% or more and 96% or less; and a total length per unit area of an interface between an untempered martensite phase and the ferrite phase and an interface between the untempered martensite phase and the tempered martensite phase is $6.3 \times 10^8$ μm/m² or more and $5.0 \times 10^{11}$ μm/m² or less.

$$\frac{[\% \text{ Cr}] + 2.6[\% \text{ Mo}]}{[\% \text{ C}]} \geq 2.0 \quad (1)$$

In Expression (1), [% M] (M=Cr, Mo, C) represents the content of each element in mass %.

[2] The high-strength steel sheet according to [1], where the component composition further contains, in mass %, one or two or more selected from V: 0.001 to 0.3%, Cu: 0.001 to 0.1%, and Ni: 0.001 to 0.2%.

[3] The high-strength steel sheet according to [1] or [2], where a hot-dip coating layer is included on a surface.

[4] The high-strength steel sheet according to [3], where the hot-dip coating layer having a component composition containing, in mass %, Fe: 5.0 to 20.0%, Al: 0.001 to 1.0%, and one or two or more selected from Pb, Sb, Si, Sn, Mg, Mn, Ni, Cr, Co, Ca, Cu, Li, Ti, Be, Bi, and REM: 0 to 3.5% in total, with the balance being Zn and incidental impurities.

[5] The high-strength steel sheet according to [3] or [4], where the hot-dip coating layer is an alloyed hot-dip coating layer.

[6] A manufacturing method for a high-strength steel sheet, including: a hot rolling process including heating of steel having the component composition according to [1] or [2] at 1,100° C. or higher and 1,300° C. or lower, hot rolling at a finish rolling temperature of 820° C. or higher, starting cooling within 3 seconds after completing finish rolling, cooling at an average cooling rate of 30° C./s or more and less than 80° C./s from the finish rolling temperature to 700° C. and then at an average cooling rate of 10° C./s or less to a coiling temperature, and coiling at a coiling temperature of 580° C. or higher and 680° C. or lower; a cold rolling process after the hot rolling process; and an annealing process including heating to $(Ac_3-50)$° C. or higher and $(Ac_3-10)$° C. or lower at an average heating rate of 4.5° C./s or more in a temperature range of 500° C. or higher and $(Ac_3-120)$° C. or lower and cooling to (Ms-150)° C. or lower, followed by retaining in a temperature range of 200° C. or higher and 440° C. or lower for 15 seconds or more after the cold rolling process.

[7] The manufacturing method for a high-strength steel sheet according to [6], further including a hot-dip coating process including reheating to 450° C. or higher and 600° C. or lower after the annealing process, followed by hot-dip coating.

[8] The manufacturing method for a high-strength steel sheet according to [7], where the hot-dip coating process further includes alloying processing after the hot-dip coating.

"High strength" means tensile strength (TS) of 980 MPa or higher. In addition, a "high-strength steel sheet" refers to a cold-rolled steel sheet or a hot-dip coating steel sheet having a hot-dip coating layer on a cold-rolled steel sheet surface. A "hot-dip coating steel sheet" also encompasses an alloyed hot-dip coating steel sheet, in addition to a hot-dip coating steel sheet.

A high-strength steel sheet has both high strength of 980 MPa or higher in tensile strength (TS) and excellent formability. Accordingly, a high-strength steel sheet, when applied to automotive parts, especially automotive body parts, can realize further reduction in weight of automotive parts. Moreover, a high-strength steel sheet having excellent coating properties in hot-dip coating can provide a hot-dip coating steel sheet having high strength and excellent formability as well as suppressed formation of uncoated portions.

DETAILED DESCRIPTION

We intensively examined the requirements for a high-strength steel sheet having both a tensile strength of 980 MPa or higher and good formability. To achieve a tensile strength of 980 MPa, we focused on the tempered martensite phase with both excellent strength and workability. Even in the tempered martensite phase, however, defects such as cracking and local necking were observed under severe bending conditions. As a result of investigation of the requirements for improved bendability, we found that stress concentration during bending is hindered and strain is dispersed by taking advantage of transformation strain during martensite transformation, presumably due to dislocations formation. In addition, we found that by ensuring a specific component composition, allowing a specific amount of a fine ferrite phase with a specific grain size to exist, and setting an area ratio of a tempered martensite phase and an interfacial length between an untempered martensite phase and the ferrite phase or between the untempered martensite phase and the tempered martensite phase to specific ranges, a high-strength steel sheet having a tensile strength of 980 MPa or higher and good formability is provided through further effective introduction of transformation strain by the untempered martensite phase. Furthermore, such a high-strength steel sheet was revealed to have good coating properties in hot-dip coating.

We thus now describe examples of our methods and steel sheets.

Component Composition of High-Strength Steel Sheet

The component composition of a high-strength steel sheet contains, in mass %, C: 0.07 to 0.14%, Si: 0.65 to 1.65%, Mn: 1.8 to 2.6%, P: 0.05% or less, S: 0.005% or less, Al: 0.08% or less, N: 0.0060% or less, Ti: 0.005 to 0.030%, B: 0.0002 to 0.0030%, and either or both of Cr: 0.01 to 0.40% and Mo: 0.01 to 0.50%; and satisfies Expression (1):

$$\frac{[\% \text{ Cr}] + 2.6[\% \text{ Mo}]}{[\% \text{ C}]} \geq 2.0 \quad (1)$$

In Expression (1), [% M] (M=Cr, Mo, C) represents the content of each element in mass %.

Hereinafter, each composition component will be described. In the description below, %" represents the content of each component in mass %.

C: 0.07 to 0.14%

C relates to formation of an untempered martensite phase and a tempered martensite phase as well as the strength thereof. To achieve a tensile strength of 980 MPa or higher, C content is required to be at least 0.07% or more. Meanwhile, when C content exceeds 0.14%, coarse cementite is formed, thereby impairing bendability. Accordingly, C content is 0.07 to 0.14%. The lower limit of C content is preferably 0.08% or more, more preferably 0.09% or more, and further preferably 0.10% or more. The upper limit of C content is preferably 0.13% or less, more preferably 0.12% or less, and further preferably 0.11% or less.

Si: 0.65 to 1.65%

Si is an element that enhances work hardenability and contributes to improved bendability. Si is also involved in formation of the ferrite phase. A high-strength steel sheet is annealed by rapid heating during manufacture. When Si content is less than 0.65%, it becomes difficult to achieve a desired area ratio of the ferrite phase in a stable manner and, consequently, bendability deteriorates. Therefore, to achieve desired bendability, Si is required to be contained in at least 0.65% or more. Further, when Si content exceeds 1.65%, an adverse effect on coating properties becomes evident. Accordingly, Si content is 1.65% or less. The lower limit of Si content is preferably 0.80% or more, more preferably 0.90% or more, and further preferably 1.00% or more. The upper limit of Si content is preferably 1.60% or less, more preferably 1.50% or less, and further preferably 1.40% or less.

Mn: 1.8 to 2.6%

Mn is an element that enhances hardenability and contributes to suppressed formation of a coarse ferrite phase. To achieve the needed hardenability, Mn is required to be contained in 1.8% or more. Meanwhile, since Mn decreases the Ms temperature, when the amount of Mn is excessive, the specified untempered martensite phase cannot be obtained. In addition, since Mn decreases the martensite transformation start temperature, an extremely high cooling rate is required during cooling to a cooling stop temperature of (Ms-150° C.) or lower in the annealing process during manufacture of a high-strength steel sheet. When control of such a cooling rate is lost, bendability deteriorates. Further, Mn impairs coating properties. Accordingly, Mn content is 1.8 to 2.6%. The lower limit of Mn content is preferably 1.9% or more, more preferably 2.0% or more, and further preferably 2.1% or more. The upper limit of Mn content is preferably 2.5% or less, more preferably 2.4% or less, and further preferably 2.3% or less.

P: 0.05% or Less

P is an element that segregates in grain boundaries and impairs bendability. P content is allowed up to 0.05%. P content is 0.05% or less and more preferably 0.04% or less. P content is desired to be decreased as much as possible, but 0.002% of P is sometimes inevitably incorporated during manufacture.

S: 0.005% or Less

S forms coarse MnS in steel, and MnS is elongated during hot rolling into wedge-shaped inclusions, thereby adversely affecting bendability. S content is allowed up to 0.005%. S content is 0.005% or less and more preferably 0.003% or less. S content is desired to be decreased as much as possible, but 0.0002% of S is sometimes inevitably incorporated during manufacture.

Al: 0.08% or Less

When Al is added as a deoxidizing agent in the steelmaking stage, Al content is preferably 0.02% or more and more preferably 0.03% or more. Meanwhile, Al forms an oxide that impairs bendability. Accordingly, Al content is 0.08% or less, preferably 0.07% or less, more preferably 0.06% or less, and further preferably 0.05% or less.

N: 0.0060% or Less

N is an undesirable element that adversely affects bendability through formation of coarse inclusions by bonding with Ti and/or B, that impairs hardenability, and hinders formation of a fine ferrite phase. N content is allowed up to 0.0060%. N content is preferably 0.0050% or less and more preferably 0.0040% or less. N content is desired to be decreased as much as possible, but 0.0005% of N is inevitably incorporated during manufacture in some cases.

Ti: 0.005 to 0.030%

Ti is an element that can fix N, which is an undesirable element, as a nitride and suppress impairment by N of B-derived hardenability. To suppress impairment of B-derived hardenability, Ti is required to be contained in at least 0.005% or more. Meanwhile, when Ti content exceeds 0.030%, bendability deteriorates due to coarse Ti carbonitride. Accordingly, Ti content is 0.005% to 0.030%. Further, it is preferable to set Ti content to 0.010 to 0.028% and limit the content of Nb, which is an element that can form other coarse inclusions, to less than 0.003%.

B: 0.0002 to 0.0030%

B is an element that enhances hardenability and contributes to formation of a fine ferrite phase. B is required to be contained in at least 0.0002% or more to obtain such an effect. Meanwhile, when B content exceeds 0.0030%, bendability deteriorates due to an adverse effect of decreased ductility due to dissolved B. Accordingly, B content is 0.0002% to 0.0030%. The lower limit of B content is preferably 0.0005% or more, more preferably 0.0006% or more, and further preferably 0.0010% or more. The upper limit of B content is preferably 0.0025% or less, more preferably 0.0020% or less, and further preferably 0.0016% or less.

Either or Both of Cr: 0.01 to 0.40% and Mo: 0.01 to 0.50%

Cr and Mo are elements that enhance hardenability and contribute to formation of a fine ferrite phase. 0.01% or more of Cr, 0.01% or more of Mo, or 0.01% or more of each Cr and Mo is required to be contained to obtain such an effect. Meanwhile, since the above effect levels off when Cr content exceeds 0.40%, the upper limit is set to 0.40%. In addition, when Cr content exceeds 0.40%, coating properties deteriorate, and thus a steel sheet having good coating properties cannot be obtained. Also in view of coating properties, Cr content is preferably 0.40% or less. Meanwhile, when Mo content exceeds 0.50%, the transformation temperature falls outside the suitable range, and thus the specified untempered martensite phase cannot be obtained. Accordingly, Cr content is 0.40% or less and Mo content is 0.50% or less. The lower limit of Cr content is preferably 0.02% or more, more preferably 0.03% or more, and further preferably 0.04% or more. The upper limit of Cr content is preferably 0.35% or less, more preferably 0.30% or less, and further preferably 0.20% or less. The lower limit of Mo content is preferably 0.02% or more, more preferably 0.05% or more, and further preferably 0.10% or more. The upper limit of Mo content is preferably 0.43% or less, more preferably 0.40% or less, and further preferably 0.30% or less.

Satisfying Expression (1)

Cr and Mo effectively suppress formation of a coarse ferrite phase due to enhanced hardenability during annealing, as well as suppress displacement of austenite/ferrite interfaces during austenite-ferrite transformation in the cooling process after completing finish rolling in the hot rolling process, thereby also effectively refining the hot-rolled microstructure. Refinement of the hot-rolled microstructure results in predominant formation of portions with high C concentration in a hot-rolled sheet and, consequently, the specified untempered martensite microstructure is obtained. When C content is high, however, the distribution density of the portions with high C concentration becomes low, and thus the specified microstructure is not obtained. Cr and Mo are required to be contained in ranges that satisfy Expression (1) to suppress this. The coefficient of Mo represents the extent of the effect to change C distribution density. A preferred range of the left-hand side of Expression (1) is 2.1 or more. The upper limit of Expression (1) is absent and determined by the upper limit of Cr and Mo content.

The basic component composition of a high-strength steel sheet is described above. A high-strength steel sheet, however, may further contain, in mass %, one or two or more selected from V: 0.001 to 0.3%, Cu: 0.001 to 0.1%, and Ni: 0.001 to 0.2%.

V, Cu, and Ni are elements that contribute to further high strengthening. Strength stability is improved by including these elements. To obtain such an effect, V, Cu, and Ni are preferably contained each in at least 0.001% or more. Meanwhile, when V content exceeds 0.3%, Cu content exceeds 0.1%, and/or Ni content exceeds 0.2%, the transformation temperatures of a steel sheet is changed, thereby making it difficult to obtain the desired microstructure. A preferred V content is 0.01 to 0.2%, a preferred Cu content is 0.01 to 0.08%, and a preferred Ni content is 0.01 to 0.1%.

Components other than those described above are Fe and incidental impurities. When the above-described component composition contains a component that is not required to be contained in less than the lower limit, such a component is regarded to be contained as an incidental impurity.

Further, our high-strength steel sheet preferably satisfies Expression (2):

$$[\% \text{ Cr}] \leq 0.215[\% \text{ Si}]^2 - 0.8[\% \text{ Si}] + 0.747 \quad (2)$$

where [% M] (M=Cr, Si) represents the content of each element in mass %.

Satisfying Expression (2)

Coating properties deteriorate by their synergistic effect when both Si and Cr are contained. Accordingly, in view of coating properties, the upper limit of Cr content varies corresponding to Si content. Expression (2) is an approximation of a relationship between changing Si and the upper limit of Cr content for achieving good coating properties. Within a range that satisfies Expression (2), a steel sheet having good coating properties is obtained.

Metal Microstructure of High-Strength Steel Sheet

Next, the metal microstructure (steel microstructure) of a high-strength steel sheet will be described. The metal microstructure is obtained by observing the microstructure of a cross-section parallel to the rolling direction of the high-strength steel sheet under a scanning electron microscope.

The metal microstructure of a high-strength steel sheet has: an average grain size of a ferrite phase of 1.5 μm or less; an area ratio of the ferrite phase of 2% or more and 15% or less; an area ratio of a tempered martensite phase of 75% or more and 96% or less; and a total length per unit area of an interface between an untempered martensite phase and the ferrite phase and an interface between the untempered martensite phase and the tempered martensite phase of $6.3 \times 10^8$ μm/m² or more and $5.0 \times 10^{11}$ μm/m² or less.

Ferrite Phase Average Grain Size of 1.5 μm or Less, Ferrite Phase Area Ratio of 2% or More and 15% or Less The ferrite phase is a microstructure with ductility and effectively enhances bendability. A microstructure totally free of the ferrite phase exhibits unsatisfactory work hardenability and ductility and, consequently, cracking results due to insufficient ductility or stress concentration during bending. Meanwhile, when ferrite grains are coarse, formation of a fine untempered martensite phase is hindered, thereby rather impairing bendability. Moreover, when the ferrite phase is excessive in amount, it becomes difficult to achieve a tensile strength of 980 MPa or higher by the untempered martensite phase and the tempered martensite phase in a high-strength steel sheet.

Accordingly, in view of strength and bendability, it is required to control both an average grain size and an area ratio of the ferrite phase. It is required to set an average grain size of the ferrite phase to 1.5 μm or less and an area ratio of the ferrite phase to 2% or more and 15% or less. Preferably, an average grain size of the ferrite phase is 1.2 μm or less and an area ratio of the ferrite phase is 2% or more and 10% or less. The lower limit of the average grain size of the ferrite phase is not particularly limited, but may be 0.1 μm or more, for example.

Tempered Martensite Phase Area Ratio of 75% or More and 96% or Less

The tempered martensite phase is a microstructure in which oriented fine iron carbides and traces of corrosion are observed inside crystal grains. Examples of the iron carbides include cementite, η-carbide, χ-carbide, and ε-carbide. The tempered martensite phase has an excellent balance between strength and ductility, and our steel sheets achieves their strength mainly due to the tempered martensite phase. Tensile strength tends to be decreased when an area ratio of the tempered martensite phase becomes less than 75%. Although depending on an average grain size of the ferrite phase and an area ratio of the ferrite phase, too, when an average area ratio of the tempered martensite phase becomes less than 75%, tensile strength sometimes becomes lower than 980 MPa. Meanwhile, an area ratio of the tempered martensite phase exceeds 96%, desired good bendability cannot be obtained. Accordingly, an area ratio of the tempered martensite phase is 75% or more and 96% or less. As the microstructure becomes further uniform, fluctuations in tensile characteristics tend to be smaller. An area ratio of the tempered martensite phase is thus preferably more than 85% and further preferably 86% or more. The upper limit is preferably 94% or less and more preferably 91% or less. The tempered martensite phase can be formed, for example, by forming a martensite phase through rapid cooling after heating in the annealing process of the manufacturing method for a high-strength steel sheet described hereinafter and by changing the martensite phase during the process of retaining (holding) in a temperature range of 200° C. or higher and 440° C. or lower.

Total Length Per Unit Area of Interface Between Untempered Martensite Phase and Ferrite Phase and Interface Between Untempered Martensite Phase and Tempered Martensite Phase of $6.3 \times 10^8$ μm/m² or More and $5.0 \times 10^{11}$ μm/m² or Less The untempered martensite phase is a microstructure in which iron carbides are not observed inside grains and observed as white contrast under a scanning electron microscope. When a total length per unit area of an interface between the untempered martensite phase and the ferrite phase and an interface between the untempered martensite phase and the tempered martensite phase is $6.3 \times 10^8$ μm/m² or more and $5.0\times10^{11}$ μm/m² or less, a steel sheet exhibits good bendability. When the total length of the interfaces is $6.3\times10^8$ μm/m² or more and $5.0\times10^{11}$ μm/m² or less, we believe that appropriate dislocations are introduced into the inside of a steel sheet, thereby suppressing stress concentration during bending and achieving good bendability. The untempered martensite phase is obtained by a manufacturing method for a high-strength steel sheet described in detail hereinafter. Due to the transformation strain during formation of this untempered martensite phase, dislocations are introduced into adjacent microstructures. When an adjacent microstructure of the untempered martensite phase is untempered martensite phase, an effect of enhancing bendability due to introduction of dislocations cannot be obtained. Accordingly, the untempered martensite phase is required to have a region adjacent to the ferrite phase or the tempered martensite phase. To obtain an effect of enhancing bendability, a total length per unit area of an interface between the untempered martensite phase and the ferrite phase and an interface between the untempered martensite phase and the tempered martensite phase is required to be $6.3\times10^8$ μm/m² or more.

Meanwhile, the total length of the interfaces exceeds $5.0\times10^{11}$ μm/m², bendability deteriorates, presumably due to excessive introduction of dislocations. The lower limit of the total length per unit area of an interface between the untempered martensite phase and the ferrite phase and an interface between the untempered martensite phase and the tempered martensite phase is preferably $8.0\times10^8$ μm/m² or more and more preferably $1.0\times10^{10}$ μm/m² or more. The upper limit is preferably $4.6\times10^{11}$ μm/m² or less and more preferably $20\times10^{10}$ μm/m² or less.

In addition to the ferrite phase, the tempered martensite phase, and the untempered martensite phase, a retained austenite phase (retained γ) and/or a bainite phase (B) may be contained in about 4% or less, for example. An area ratio of the untempered martensite is not particularly limited provided that the total length of the interfaces is in the specific range, but is often 1 to 5%.

Hot-Dip Coating Layer

A high-strength steel sheet may be a steel sheet including a hot-dip coating layer on the surface, in other words, a hot-dip coating steel sheet or an alloyed hot-dip coating steel sheet. Hereinafter, the hot-dip coating layer will be described. Components for the hot-dip coating layer are not particularly limited and may be any common component. Examples of the hot-dip coating layer include a Zn-based coating layer and an Al-based coating layer. Examples of Zn-based coatings include common hot-dip galvanizing (GI), Zn—Ni coatings, and Zn—Al coatings. Further, examples of Al-based coatings include Al—Si coatings (an Al—Si coating containing 10 to 20 mass % of Si, for example). Specific examples of the Zn-based coating layer include a hot-dip galvanizing layer containing, in mass %, Fe: 5.0 to 20.0%, Al: 0.001 to 1.0%, and one or two or more selected from Pb, Sb, Si, Sn, Mg, Mn, Ni, Cr, Co, Ca, Cu, Li, Ti, Be, Bi, and REM: 0 to 3.5% in total, with the balance being Zn and incidental impurities. Moreover, the hot-dip coating layer may be an alloyed hot-dip coating layer. Examples of the alloyed hot-dip coating layer include a galvannealed (GA) layer. The coating weight is optional, but is desired to be 120 g/m² or less per side in view of weldability. The lower limit of the coating weight is not particularly limited, but is typically 30 g/m² or more.

The thickness of a high-strength steel sheet is not particularly limited, but is preferably 0.5 mm or more and 2.6 mm or less. In a high-strength steel sheet including a coating layer, the thickness refers to the thickness of a base steel sheet excluding the coating layer.

Manufacturing Method for High-Strength Steel Sheet

Next, a manufacturing method for a high-strength steel sheet will be described. A manufacturing method for a high-strength steel sheet includes a hot rolling process, a cold rolling process, and an annealing process. Specifically, a manufacturing method for a high-strength steel sheet includes: a hot rolling process including heating of steel having the above-described component composition at 1,100° C. or higher and 1,300° C. or lower, hot rolling at a finish rolling temperature of 820° C. or higher, starting cooling within 3 seconds after completing finish rolling, cooling at an average cooling rate of 30° C./s or more and less than 80° C./s from the finish rolling temperature to 700° C. and then at an average cooling rate of 10° C./s or less to a coiling temperature, and coiling at a coiling temperature of 580° C. or higher and 680° C. or lower; a cold rolling process after the hot rolling process; and an annealing process including heating to $(Ac_3-50)°$ C. or higher and $(Ac_3-10)°$ C. or lower at an average heating rate of 4.5° C./s or more in a temperature range of 500° C. or higher and $(Ac_3-120)°$ C. or lower and cooling to $(Ms-150)°$ C. or lower, followed by retaining in a temperature range of 200° C. or higher and 440° C. or lower for 15 seconds or more.

In addition, when a high-strength steel sheet having a hot-dip coating layer on the surface is manufactured, a hot-dip coating process by reheating at 450° C. or higher and 600° C. or lower after the annealing process, followed by hot-dip coating is included. Further, when a high-strength steel sheet having an alloyed hot-dip coating layer on the surface is manufactured, the hot-dip coating process further includes alloying processing after the hot-dip coating. Hereinafter, each process will be described in detail. In the description hereinafter, a temperature refers to a surface temperature of steel or a steel sheet unless otherwise specified. Further, an average heating rate is set as ((surface temperature after heating−surface temperature before heating)/heating time) and an average cooling rate is set as ((surface temperature before cooling−surface temperature after cooling)/cooling time).

Hot Rolling Process

The hot rolling process includes heating of steel having the above-described component composition at 1,100° C. or higher and 1,300° C. or lower, hot rolling at a finish rolling temperature of 820° C. or higher, starting cooling within 3 seconds after completing finish rolling, cooling at an average cooling rate of 30° C./s or more and less than 80° C./s from the finish rolling temperature to 700° C. and then at an average cooling rate of 10° C./s or less to a coiling temperature, and coiling at a coiling temperature of 580° C. or higher and 680° C. or lower.

A refining method for manufacture of the above-mentioned steel is not particularly limited, and may employ a commonly known refining method in a converter or an electric furnace, for example. In addition, secondary refining may be performed in a vacuum degasser. Subsequently, a slab (steel) is preferably formed by continuous casting in view of productivity and/or quality. A slab may also be formed by commonly known casting method such as ingot casting-slabbing or thin slab continuous casting.

Heating Temperature of Steel: 1,100° C. or Higher and 1,300° C. or Lower

A microstructure of steel is required to be changed into a substantially homogenous austenite phase by heating the steel before rough rolling. Further, to suppress formation of coarse inclusions, controlling the heating temperature is important. When the heating temperature is lower than 1,100° C., a desired finishing temperature cannot be achieved. Meanwhile, when the heating temperature exceeds 1,300° C., scale loss increases, and damage to the furnace body of a heating furnace increases. Accordingly, the heating temperature of the steel is required to be 1,100° C. or higher and 1,300° C. or lower. The lower limit of the heating temperature of steel is preferably 1,120° C. or higher and more preferably 1,150° C. or higher. The upper limit is preferably 1,280° C. or lower and more preferably 1,260° C. or lower. Rough rolling conditions for the rough rolling after heating are not particularly limited.

Finish Rolling Temperature: 820° C. or Higher

Finish rolling after rough rolling is performed at a temperature of 820° C. or higher. When the finish rolling temperature is lower than 820° C., austenite-ferrite transformation starts during rolling and, consequently, the specified steel sheet microstructure cannot be obtained due to grain growth of ferrite. Accordingly, in our manufacturing method, a finish rolling temperature is 820° C. or higher and preferably 840° C. or higher. The upper limit of the finish rolling temperature is not particularly limited, but is typically 1,000° C. or lower.

Cooling is started within 3 seconds after completing finish rolling, and a rolled steel sheet is cooled at an average cooling rate of 30° C./s or more and less than 80° C./s from the finish rolling temperature to 700° C. and then at an average cooling rate of 10° C./s or less to a coiling temperature, and is coiled at a coiling temperature of 580° C. or higher and 680° C. or lower.

In a hot-rolled steel sheet, it is required to form a microstructure having a fine ferrite microstructure such that the interface length of the untempered martensite phase is increased to satisfy the above-described specific range. After completing finish rolling, when the time to start cooling to 700° C. from the finish rolling temperature at an average cooling rate of 30° C./s or more exceeds 3 seconds (s), austenite-ferrite transformation starts at a high temperature and consequently, a fine ferrite microstructure cannot be obtained. From the start of the cooling to 700° C., it is also a temperature range in which a migration rate of austenite-ferrite grain boundaries is fast and ferrite grains tend to become coarse. Accordingly, an average cooling rate from the finish rolling temperature to 700° C. is required to be 30° C./s or more.

Meanwhile, when cooling is performed at a cooling rate of 80° C./s or more, controlling of a cooling stop temperature becomes unstable and C diffusion at 700° C. or lower described hereinafter is unlikely to be progressed, thereby making it difficult to obtain the desired steel sheet microstructure. At 700° C. or lower, it is required to diffuse C into ferrite interfaces and grain boundary triple points to form high-concentration portions, thereby promoting formation of the untempered martensite phase. Accordingly, an average cooling rate from 700° C. to a coiling temperature is required to be 10° C./s or less.

It is preferable to cool, within 0.1 second or more and 2.0 seconds or less after completing finish rolling, at an average cooling rate of 35° C./s or more and less than 80° C./s from the finish rolling temperature to 700° C., and then cool at an average cooling rate of 8° C./s or less to a coiling temperature. Cooling at an average cooling rate of 30° C./s or more and less than 80° C./s from the finish rolling temperature to 700° C. and the subsequent cooling at an average cooling rate of 10° C./s or less to a coiling temperature may be performed consecutively. It is, however, preferable to cool at an average cooling rate of 30° C./s or more and less than 80° C./s from the finish rolling temperature to 700° C., then retain at 680° C. or higher and 700° C. or lower for 3 seconds or more and 15 seconds or less without performing forced cooling (in other words, without performing a particular cooling operation) in view of the above-mentioned C concentration distribution, and subsequently cool at an average cooling rate of 10° C./s or less to a coiling temperature. The lower limit of the average cooling rate to a coiling temperature is not particularly limited, but is typically 1° C./s or more.

Coiling Temperature of 580° C. or Higher and 680° C. or Lower

It is important in coiling not to change a formed fine ferrite microstructure and not to form low-temperature transformation phases such as a bainite phase. When the coiling temperature is lower than 580° C., bainite transformation is likely to start and, consequently, the specified untempered martensite microstructure cannot be obtained. Meanwhile, when the coiling temperature exceeds 680° C., the length of an interface between the untempered martensite phase and the ferrite phase and an interface between the untempered martensite phase and the tempered martensite phase is decreased due to grain growth of ferrite. Accordingly, the coiling temperature range is required to be 580° C. or higher and 680° C. or lower. The lower limit is preferably 600° C. or higher and more preferably 610° C. or higher. The upper limit is preferably 660° C. or lower and more preferably 650° C. or lower.

Cold Rolling Process

The cold rolling process is a process in which a hot-rolled sheet is cold-rolled after the hot rolling process. To obtain a desired thickness, cold rolling of a hot-rolled sheet after the hot rolling process is required. Conditions for the cold rolling process are not particularly limited. In view of sheet shapes during cold rolling, however, a reduction ratio of the cold rolling is preferably 40 to 80%.

Annealing Process

The annealing process is a process including heating to $(Ac_3-50)$° C. or higher and $(Ac_3-10)$° C. or lower at an average heating rate of 4.5° C./s or more in a temperature range of 500° C. or higher and $(Ac_3-120)$° C. or lower and cooling to $(Ms-150)$° C. or lower, followed by retaining in a temperature range of 200° C. or higher and 440° C. or lower for 15 seconds or more. The annealing process is performed on a non-oxidizing or a direct-fired continuous annealing line, for example, and performed on a non-oxidizing or a direct-fired continuous hot-dip coating line when a hot-dip coating layer is to be provided.

Average Heating Rate of 4.5° C./s or More in Temperature Range of 500° C. or Higher and $(Ac_3-120)$° C. or Lower To obtain the specified martensite phase, a fine ferrite phase is formed in the hot rolling process. This effect of fine ferrite phase formation is lost if its recovery progresses during heating in the annealing process. Accordingly, it is required to hinder the recovery while allowing recrystallization or ferrite-austenite transformation to progress. The recovery progresses at 500° C. or higher, and recrystallization or ferrite-austenite transformation starts at $(Ac_3-120)$° C. or lower.

Accordingly, during heating to $(Ac_3-50)$° C. or higher and $(Ac_3-10)$° C. or lower after the cold rolling process, an average heating rate in a temperature range of 500° C. or higher and $(Ac_3-120)$° C. or lower is required to be 4.5° C./s or more. $Ac_3$ represents a temperature at which ferrite-austenite transformation is completed during heating. An average heating rate in a temperature range of 500° C. or higher and $(Ac_3-120)$° C. or lower is preferably 5.0° C./s or more. During heating to $(Ac_3-50)$° C. or higher and $(Ac_3-10)$° C. or lower after the cold rolling process, a heating rate at a temperature lower than 500° C. and higher than $(Ac_3-120)$° C. is not particularly limited. Further, the upper limit of the average heating rate is not particularly limited, but is typically 50° C./s or less.

Heating Temperature (Annealing Temperature): $(Ac_3-50)$° C. or Higher and $(Ac_3-10)$° C. or Lower In the heating process, an appropriate amount of ferrite phase is required to be formed. When the heating temperature falls outside the range of $(Ac_3-50)$° C. or higher and $(Ac_3-10)$° C. or lower, an area ratio of the specified ferrite phase cannot be achieved. The heating temperature is preferably $(Ac_3-40)$° C. or higher and $(Ac_3-15)$° C. or lower. The retention time at $(Ac_3-50)$° C. or higher and $(Ac_3-10)$° C. or lower is not particularly limited, but is, for example, 300 seconds or less, preferably 30 seconds or more and 300 seconds or less, and more preferably 50 seconds or more and 250 seconds or less.

Cooling Stop Temperature After Heating (Cooling End Temperature): $(Ms-150)$° C. or Lower In cooling after heating, the majority of the microstructure is required to become a martensite phase. In this process, if austenite remains without transforming into the martensite phase, a coarse untempered martensite phase or retained austenite is finally formed, thereby impairing bendability. To avoid such an adverse effect, a cooling stop temperature after heating at $(Ac_3-50)$° C. or higher and $(Ac_3-10)$° C. or lower is required to be $(Ms-150)$° C. or lower. In other words, it is required to cool to $(Ms-150)$° C. or lower after heating at $(Ac_3-50)$° C. or higher and $(Ac_3-10)$° C. or lower.

Ms represents a temperature of austenite to start transformation into a martensite phase during cooling. To obtain the desired microstructure in a stable manner, the cooling stop temperature after the heating is preferably $(Ms-170)$° C. or lower and $(Ms-300)$° C. or higher. Hardenability is enhanced by Cr, Mo, and B. When an average cooling rate from the end of heating at $(Ac_3-50)$° C. or higher and $(Ac_3-10)$° C. or lower to 550° C., in which there is a danger of grain growth of the ferrite phase, is less than 30° C./s, ferrite grains are likely to grow.

Accordingly, the average cooling rate to 550° C. is preferably 35° C./s or more and further preferably 40° C./s or more. The upper limit of the average cooling rate is not particularly limited, but is typically 70° C./s or less. After cooling to $(Ms-150)$° C. or lower, it is preferable to perform a retention process at 200° C. or higher and 440° C. or lower for 15 s or more after retaining at a temperature of $(Ms-150)$° C. or lower for 7 s or more and 50 s or less, for example.

Retention at 200° C. or Higher and 440° C. or Lower for 15 s or More

To form a tempered martensite phase from the martensite phase obtained by cooling to $(Ms-150)$° C. or lower, it is required to retain (hold) in a temperature range of 200° C. or higher and 440° C. or lower for 15 s or more. In addition, by retaining (holding) in a temperature range of 200° C. or higher and 440° C. or lower for 15 s or more, there is also an effect of distributing C in the austenite phase, decreasing the Ms temperature locally, and promoting formation of an untempered martensite phase. When the cooling stop temperature is lower than 200° C., heating is performed to a temperature range of 200° C. or higher and 440° C. or lower.

If the retention temperature (holding temperature) in a temperature range of 200° C. or higher and 440° C. or lower were lower than 200° C., satisfactory tempering effects cannot be obtained due to slow diffusion of supersaturated carbon contained in the martensite phase, and consequently, bendability deteriorates. When the retention temperature exceeds 440° C., the specified high strength cannot be achieved since not only the martensite phase is excessively tempered, but also untempered martensite is not obtained due to decomposition of austenite. Moreover, when the retention time is less than 15 s, bendability deteriorates since tempered martensite phase is not obtained sufficiently. A preferred retention condition is to be held at 250° C. or higher and 430° C. or lower for 20 s or more. The upper limit of the retention time is not particularly limited, but is typically 100 s or less.

Hot-Dip Coating Process

The hot-dip coating process is a process including reheating at 450° C. or higher and 600° C. or lower after the annealing process, followed by hot-dip coating. A high-strength steel sheet having a hot-dip coating layer, i.e., a hot-dip coating steel sheet, is thus obtained. Further, by performing alloying processing after the hot-dip coating in the hot-dip coating process, a high-strength steel sheet having an alloyed hot-dip coating layer, i.e., an alloyed hot-dip coating steel sheet is obtained.

Reheating to 450° C. or Higher and 600° C. or Lower

A steel sheet after the annealing process is required to be immersed in a coating bath to obtain a hot-dip coating steel sheet. The component composition of the coating bath may be the same as the component composition of a hot-dip coating layer to be manufactured. In view of the appearance quality of a hot-dip coating steel sheet, the reheating temperature is required to be 450° C. or higher. Meanwhile, if the heating temperature is excessively elevated during alloying processing, strength is decreased and, consequently, a desired tensile strength cannot be achieved. Up to 600° C. is allowed. Accordingly, the reheating temperature is 450° C. or higher and 600° C. or lower. The temperature of the coating bath is preferably about 450° C. or higher and lower than 500° C. Further, the alloying processing temperature is preferably 500° C. or higher and 600° C. or lower.

When a cold-rolled steel sheet without a coating layer is manufactured, it is preferable to be retained in a temperature range of 200° C. or higher and 440° C. or lower for 15 seconds or more in the annealing process, followed by rapid cooling to room temperature by using water or the like. Further, when a cold-rolled steel sheet including a coating layer on the surface is manufactured, it is preferable to perform the hot-dip coating process including being reheated to 450° C. or higher and 600° C. or lower, followed by hot-dip coating and, subsequently, to cool rapidly to room temperature by using water or the like. Room temperature herein means 0° C. or higher and 50° C. or lower. Further, rapid cooling herein refers to cooling at a cooling rate of 20° C./s or more.

EXAMPLES

Each steel sheet was obtained by performing a hot rolling process on 250 mm-thick steel having the component composition shown in Table 1, with the balance being Fe and incidental impurities, under the hot rolling conditions shown in Table 2; performing a cold rolling process at a cold reduction ratio of 40% or more and 80% or less to yield a cold-rolled sheet with a thickness of 1.0 to 2.0 mm; and performing an annealing process under the conditions shown in Table 2.

Subsequently, the obtained steel sheets were hot-dip coated to form a galvanized layer on the surface (GI material). Some of the steel sheets in which a galvanized layer was formed were subjected, after formation of the hot-dip coating layer, to alloying processing at the alloying temperature shown in Table 2 to form a galvannealed layer (GA material).

Each steel sheet completed with the annealing process was manufactured in a direct-fired continuous annealing line, whereas each steel sheet having a hot-dip coating layer or an alloyed hot-dip coating layer formed was manufactured in a direct-fired continuous hot-dip coating line. The temperature of a coating bath (coating composition: Zn—0.13 mass % Al) for immersion on the direct-fired continuous hot-dip coating line was set to 460° C., the coating weight per side was set to 45 to 65 g/m$^2$ for both GI materials (hot-dip coating steel sheets) and GA materials (alloyed hot-dip coating steel sheet), and an amount of Fe contained in each coating layer was set to a range of 6 to 14 mass %. The $Ac_3$ temperature was obtained from a dilatation curve for transformation acquired by using a thermal expansion measuring device at a heating rate of 6° C./s. The Ms temperature was obtained from a transformation curve obtained by using a thermal expansion measuring device at a cooling rate of 30° C./s from the $Ac_3$ temperature to 300° C. after heating to the $Ac_3$ temperature or higher.

In the hot rolling process, each steel sheet was cooled from a finish rolling temperature to 700° C. at an average cooling rate of 30° C./s or more, then held in a temperature range of 680° or higher and 700° C. or lower for the time (5 to 10 seconds) shown in the column Retention time in the hot rolling process of Table 2 and, subsequently, cooled to a coiling temperature at an average cooling rate of 10° C./s or less.

Regarding an average heating rate in the process of heating to $(Ac_3-50)$° C. or higher and $(Ac_3-10)$° C. or lower in the annealing process, an average heating rate only in the range of 500° C. or higher and $(Ac_3-120)$° C. lower is shown in Table 2. An average heating rate during heating to $(Ac_3-50)$° C. or higher and $(Ac_3-10)$° C. or lower was set to be the same as the average heating rate for the range of 500° C. or higher and $(Ac_3-120)$° C. or lower shown in Table 2.

Further, in the annealing process, steps of heating to $(Ac_3-50)$° C. or higher and $(Ac_3-10)$° C. or lower, holding (retaining) at a temperature of $(Ac_3-50)$° C. or higher and $(Ac_3-10)$° C. or lower for the time (51 to 169 s) shown in the column Retention time of the annealing process in Table 2, and subsequent cooling to (Ms-150)° C. or lower were performed.

Further, in the annealing process, steps of cooling to (Ms-150)° C. or lower, holding (retaining) at a temperature of (Ms-150)° C. or lower for the time (8 to 37 s) shown in the column Primary retention time of the hot rolling process in Table 2, and subsequent retaining at 200° C. or higher and 440° C. or lower for 15 s or more were performed.

Meanwhile, when a cold-rolled steel sheet without a coating layer was manufactured, a steel sheet was retained in a temperature range of 200° C. or higher and 440° C. or lower for 15 seconds or more, followed by rapid cooling to room temperature by using water (average cooling rate of about 50° C./s). When a cold-rolled steel sheet having a galvanized layer on the surface was manufactured, a steel sheet was immersed in the coating bath, followed by rapid cooling to room temperature by using water (average cooling rate of about 50° C./s). When a cold-rolled steel sheet having a galvannealed layer on the surface was manufactured, a steel sheet was alloying processed at an alloying temperature, followed by rapid cooling to room temperature by using water (average cooling rate of about 50° C./s).

Specimens were taken from cold-rolled steel sheets without a coating layer, hot-dip coating steel sheets, or alloyed hot-dip coating steel sheets obtained as in the foregoing and evaluated according to the following methods.

(i) Microstructure Observation

An area ratio of each phase was evaluated according to the following method. Each steel sheet obtained was cut out so that the cross-section parallel to the rolling direction became an observation surface. The cross-section was etched with 1% Nital, magnified at 2,000× under a scanning electron microscope, and imaged for 10 fields within the region from the surface to the (¼)t thickness position, where t represents a thickness (sheet thickness) of the steel sheet. The ferrite phase is a microstructure having morphology with no observed traces of corrosion or iron carbides inside grains of the ferrite phase. The tempered martensite phase is a microstructure in which many oriented fine iron carbides as well as traces of corrosion are observed inside crystal grains. Meanwhile, the untempered martensite phase is a microstructure in which iron carbides are not observed inside grains and which is observed as white contrast under a scanning electron microscope. Since grain boundaries are also observed as white contrast, a linear microstructure (aspect ratio calculated as long-axis length/short-axis length of 10 or more) was excluded from the untempered martensite phase. Microstructures other than the ferrite phase, the tempered martensite phase, and the untempered martensite phase are denoted in Table 3 as "Other metal microstructure." In the column "Other metal microstructure" in Table 3, B denotes bainite and retained γ denotes retained austenite.

An average grain size of the ferrite phase (denoted as "Ferrite average grain size" in Table 3), an area ratio of the ferrite phase (denoted as "Ferrite area ratio" in Table 3), an area ratio of the tempered martensite phase (denoted as "Tempered martensite area ratio" in Table 3), and a total length per unit area of an interface between the untempered martensite phase and the ferrite phase and an interface between the untempered martensite phase and the tempered martensite phase (denoted as "Interface length of untempered martensite" in Table 3) were obtained by performing image analysis of observed results under a scanning electron microscope. Image analysis was performed by using image analysis software (Image-Pro Plus ver. 7.0, from Nippon Roper K.K.).

An area ratio of the ferrite phase was obtained by extracting only the ferrite phase portion in each observed field, calculating an area ratio of the ferrite phase relative to the observed field area, and averaging area ratio values in 10 fields. Similarly, an area ratio of the tempered martensite phase was obtained by extracting only the tempered martensite phase portion in each observed field, calculating an area ratio of the tempered martensite phase relative to the observed field area, and averaging area ratio values in 10 fields.

Further, an average grain size of the ferrite phase was obtained by calculating an equivalent circle diameter corresponding to the area of each ferrite grain, calculating an average value of the equivalent circle diameter of ferrite grains in each observed field and regarding the average value as the equivalent circle diameter of ferrite grains in each observed field, and averaging the equivalent circle diameter of ferrite grains in 10 fields.

The total length per unit area of an interface between the untempered martensite phase and the ferrite phase and an interface between the untempered martensite phase and the tempered martensite phase was obtained by: determining the interfaces of the untempered martensite phase in each observed field by image analysis; obtaining a total length of interfaces between the untempered martensite phase and the ferrite phase present within the observed field and a total length of interfaces between the untempered martensite phase and the tempered martensite phase present within the observed field; dividing the total value thereof by the observed field area to yield a total length per unit area in each observed field of interfaces between the untempered martensite phase and the ferrite phase and interfaces between the untempered martensite phase and the tempered martensite phase; and averaging total lengths of 10 fields per unit area of interfaces between the untempered martensite phase and the ferrite phase and interfaces between the untempered martensite phase and the tempered martensite phase.

(ii) Tensile Test

JIS No. 5 tensile test pieces were prepared from each obtained steel sheet in a direction perpendicular to the rolling direction. A tensile test according to the stipulation of JIS Z 2241 (2011) was performed 5 times to obtain an average yield strength (YS), tensile strength (TS), and total elongation (El). The cross-head speed in the tensile test was set to 10 mm/min. In Table 3, tensile strength of 980 MPa or higher is the desired mechanical property.

(iii) Bending Evaluation

From each obtained steel sheet, a 100 mm-width coil with a direction parallel to the rolling direction as the bending test axial direction was roll-formed at R/t (R: bend radius, t: thickness) of 1.0 and 1.4, and the test piece was then visually observed to investigate the presence of cracks. In Table 3, the investigated results of cracks after roll forming at R/t=1.0 is denoted as "Bendability at R/t=1.0" and the investigated results of cracks after roll forming at R/t=1.0 is denoted as "Bendability at R/t=1.4." Cases in which cracking was observed are denoted by "O," cases in which no cracking was observed are denoted by "X," and cases in which no crack was formed at R/t=1.4 are evaluated as "good."

(iv) Coating Properties Evaluation

From each obtained steel sheet, 10 samples (width of 800 mm, length of 500 mm) for evaluation were taken and observed visually and through a 10× loupe for the presence of an uncoated portion on the steel sheet surface. Examples with no observed uncoated portion (region without formed coating) were evaluated as "good," whereas examples with an observed uncoated portion were evaluated as "poor." The obtained results are shown in Table 3.

The Examples were found to exhibit a tensile strength TS of 980 MPa or higher and good bendability. In addition, the Examples that satisfy specific conditions exhibited good coating properties. In the Examples, hot-dip coating steel sheets each including a hot-dip coating layer on the surface are illustrated. Our cold-rolled steel sheets, however, are considered to have a tensile strength TS of 980 MPa or higher and good bendability, similar to the above-described hot-dip coating steel sheets. Both the cold-rolled steel sheet and the hot-dip coating steel sheet are suitably applicable to automotive parts, for example.

Meanwhile, the Comparative Examples, which fall beyond the scope of our steel sheets, were unable to exhibit a tensile strength of 980 MPa or good bendability in evaluations.

TABLE 1

| Steel No. | Chemical composition (mass %) | | | | | | | | | | | | Left-hand side of expression (1) | Right-hand side of expression (2) | Note |
|---|---|---|---|---|---|---|---|---|---|---|---|---|---|---|---|
| | C | Si | Mn | P | S | Al | N | Ti | B | Cr | Mo | Others | | | |
| A | 0.11 | 1.52 | 2.23 | 0.02 | 0.003 | 0.05 | 0.0020 | 0.019 | 0.0006 | 0.02 | 0.19 | — | 4.7 | 0.03 | Example |
| B | 0.10 | 0.68 | 2.43 | 0.02 | 0.002 | 0.04 | 0.0026 | 0.015 | 0.0009 | 0.28 | 0.01 | — | 3.1 | 0.30 | Example |
| C | 0.09 | 0.97 | 2.44 | 0.02 | 0.001 | 0.03 | 0.0033 | 0.020 | 0.0006 | 0.03 | 0.16 | — | 5.0 | 0.17 | Example |
| D | 0.12 | 1.35 | 2.18 | 0.01 | 0.002 | 0.03 | 0.0023 | 0.020 | 0.0011 | 0.04 | 0.21 | — | 4.9 | 0.06 | Example |
| E | 0.11 | 1.21 | 2.22 | 0.01 | 0.002 | 0.04 | 0.0035 | 0.025 | 0.0016 | 0.02 | 0.28 | — | 6.8 | 0.09 | Example |
| F | 0.12 | 0.77 | 2.08 | 0.01 | 0.002 | 0.03 | 0.0030 | 0.024 | 0.0015 | 0.03 | 0.08 | V: 0.28 | 2.0 | 0.26 | Example |
| G | 0.10 | 1.32 | 2.41 | 0.02 | 0.002 | 0.03 | 0.0027 | 0.015 | 0.0006 | 0.05 | 0.15 | Cu: 0.03 Ni: 0.07 | 4.4 | 0.07 | Example |
| H | 0.06 | 0.95 | 2.11 | 0.02 | 0.001 | 0.04 | 0.0033 | 0.025 | 0.0008 | 0.15 | 0.10 | — | 6.8 | 0.18 | Comparative Example |
| I | 0.17 | 1.45 | 2.38 | 0.01 | 0.003 | 0.04 | 0.0025 | 0.019 | 0.0006 | 0.02 | 0.12 | — | 2.0 | 0.04 | Comparative Example |
| J | 0.11 | 0.21 | 1.95 | 0.01 | 0.001 | 0.03 | 0.0023 | 0.023 | 0.0015 | 0.33 | 0.10 | — | 5.4 | 0.59 | Comparative Example |
| K | 0.13 | 1.22 | 1.65 | 0.01 | 0.003 | 0.04 | 0.0030 | 0.018 | 0.0014 | 0.01 | 0.15 | — | 3.1 | 0.09 | Comparative Example |
| L | 0.12 | 0.86 | 2.25 | 0.02 | 0.002 | 0.04 | 0.0035 | 0.003 | 0.0009 | 0.19 | 0.02 | — | 2.4 | 0.22 | Comparative Example |
| M | 0.10 | 1.25 | 2.09 | 0.01 | 0.003 | 0.05 | 0.0020 | 0.024 | 0.0001 | 0.03 | 0.16 | — | 4.5 | 0.08 | Comparative Example |
| N | 0.11 | 1.31 | 2.32 | 0.01 | 0.002 | 0.04 | 0.0031 | 0.025 | 0.0006 | 0.01 | 0.72 | — | 17.1 | 0.07 | Comparative Example |
| O | 0.12 | 1.53 | 2.21 | 0.01 | 0.003 | 0.03 | 0.0025 | 0.016 | 0.0011 | 0.35 | 0.12 | — | 5.5 | 0.03 | Example |
| P | 0.13 | 1.19 | 2.17 | 0.01 | 0.003 | 0.04 | 0.0035 | 0.016 | 0.0014 | 0.03 | 0.08 | — | 1.8 | 0.10 | Comparative Example |

TABLE 2

| | | Hot rolling process | | | | | | | Cold reduction ratio (%) | Ac₃ (° C.) | Ms (° C.) |
|---|---|---|---|---|---|---|---|---|---|---|---|
| Steel sheet No. | Steel | Slab heating temperature (° C.) | Finishing temperature (° C.) | Cooling start time (s) | Cooling rate-1 (° C./s) *1 | Retention time (s) *7 | Cooling rate-2 (° C./s) *2 | Coiling temperature (° C.) | | | |
| 1 | A | 1210 | 890 | 0.9 | 57 | 9 | 3 | 610 | 43 | 899 | 410 |
| 2 | | 1250 | 910 | 1.0 | 66 | 7 | 7 | 620 | 65 | | |
| 3 | | 1200 | 860 | 3.8 | 44 | 10 | 4 | 620 | 68 | | |
| 4 | | 1230 | 880 | 1.2 | 22 | 5 | 2 | 630 | 52 | | |
| 5 | | 1180 | 910 | 1.0 | 43 | 5 | 38 | 620 | 47 | | |
| 6 | | 1190 | 870 | 0.9 | 49 | 6 | 5 | 510 | 43 | | |
| 7 | | 1180 | 890 | 1.2 | 43 | 9 | 3 | 610 | 61 | | |
| 8 | | 1180 | 870 | 1.4 | 67 | 5 | 6 | 630 | 41 | | |
| 9 | | 1200 | 920 | 0.8 | 55 | 7 | 4 | 630 | 59 | | |
| 10 | | 1260 | 930 | 2.0 | 49 | 8 | 2 | 650 | 60 | | |
| 11 | | 1250 | 840 | 1.2 | 65 | 10 | 5 | 640 | 63 | | |
| 12 | | 1260 | 850 | 0.8 | 68 | 5 | 7 | 650 | 41 | | |
| 13 | | 1260 | 860 | 1.9 | 59 | 10 | 5 | 600 | 49 | | |
| 14 | B | 1250 | 860 | 1.8 | 64 | 7 | 6 | 640 | 69 | 858 | 413 |
| 15 | | 1260 | 890 | 1.5 | 56 | 5 | 8 | 640 | 58 | | |
| 16 | C | 1230 | 880 | 0.9 | 68 | 10 | 8 | 630 | 49 | 869 | 427 |
| 17 | | 1200 | 840 | 0.9 | 63 | 8 | 3 | 610 | 51 | | |
| 18 | D | 1180 | 920 | 1.1 | 63 | 6 | 5 | 600 | 46 | 878 | 418 |
| 19 | | 1260 | 930 | 1.8 | 56 | 10 | 4 | 610 | 43 | | |
| 20 | E | 1260 | 850 | 1.2 | 42 | 6 | 3 | 630 | 55 | 890 | 414 |
| 21 | | 1190 | 840 | 1.7 | 49 | 5 | 5 | 660 | 51 | | |
| 22 | F | 1200 | 870 | 1.8 | 66 | 5 | 3 | 630 | 51 | 861 | 419 |
| 23 | | 1250 | 860 | 1.0 | 49 | 9 | 6 | 620 | 41 | | |
| 24 | G | 1240 | 860 | 1.0 | 57 | 9 | 4 | 650 | 41 | 883 | 420 |
| 25 | | 1220 | 910 | 1.4 | 66 | 9 | 7 | 640 | 66 | | |
| 26 | H | 1260 | 860 | 1.3 | 45 | 8 | 3 | 640 | 62 | 875 | 454 |
| 27 | I | 1260 | 910 | 1.3 | 47 | 10 | 8 | 600 | 59 | 873 | 396 |
| 28 | J | 1210 | 930 | 0.8 | 47 | 8 | 2 | 650 | 47 | 846 | 434 |
| 29 | K | 1240 | 900 | 1.4 | 47 | 8 | 8 | 600 | 51 | 879 | 442 |
| 30 | L | 1240 | 880 | 1.1 | 44 | 7 | 3 | 660 | 45 | 870 | 407 |
| 31 | M | 1230 | 860 | 1.7 | 39 | 9 | 3 | 640 | 41 | 886 | 437 |
| 32 | N | 1220 | 900 | 1.0 | 50 | 6 | 2 | 600 | 68 | 883 | 406 |
| 33 | O | 1250 | 860 | 0.8 | 38 | 10 | 8 | 640 | 62 | 883 | 419 |
| 34 | P | 1210 | 930 | 1.8 | 68 | 9 | 3 | 650 | 68 | 881 | 416 |

| Annealing process | | | | | | | | | |
|---|---|---|---|---|---|---|---|---|---|
| Heating rate (° C./s) *4 | Annealing temperature (° C.) | Retention time (s) | Cooling rate (° C./s) *3 | Cooling stop temperature (° C.) | Primary retention time (s) *5 | Retention temperature (° C.) | Secondary retention time (s) *6 | Alloying temperature (° C.) | Note |
| 12 | 851 | 99 | 51 | 197 | 12 | 376 | 37 | — | Example |
| 11 | 853 | 92 | 58 | 183 | 15 | 415 | 58 | 540 | Example |
| 17 | 850 | 53 | 45 | 224 | 34 | 408 | 48 | 510 | Comparative Example |
| 5 | 855 | 61 | 55 | 225 | 12 | 412 | 32 | 510 | Comparative Example |
| 18 | 861 | 70 | 46 | 215 | 8 | 389 | 30 | 520 | Comparative Example |
| 17 | 881 | 128 | 64 | 221 | 16 | 376 | 41 | 520 | Comparative Example |
| 15 | 849 | 85 | 43 | 236 | 10 | 413 | 30 | 520 | Example |
| 16 | 898 | 76 | 65 | 231 | 29 | 384 | 66 | 520 | Comparative Example |
| 6 | 838 | 114 | 46 | 225 | 12 | 393 | 70 | 540 | Comparative Example |
| 14 | 860 | 86 | 31 | 210 | 27 | 309 | 68 | 530 | Example |
| 17 | 857 | 131 | 62 | 375 | 24 | 434 | 41 | 530 | Comparative Example |
| 18 | 855 | 63 | 44 | 218 | 22 | 483 | 67 | 520 | Comparative Example |
| 12 | 857 | 112 | 57 | 230 | 37 | 418 | 2 | 500 | Comparative Example |
| 8 | 842 | 169 | 54 | 196 | 18 | 407 | 37 | — | Example |
| 16 | 838 | 135 | 46 | 195 | 19 | 323 | 63 | 510 | Example |
| 20 | 849 | 106 | 69 | 241 | 15 | 374 | 45 | — | Example |
| 20 | 844 | 125 | 54 | 214 | 13 | 414 | 50 | 540 | Example |
| 15 | 855 | 51 | 57 | 218 | 8 | 439 | 43 | — | Example |
| 15 | 851 | 143 | 41 | 240 | 22 | 382 | 61 | 540 | Example |
| 14 | 867 | 74 | 42 | 236 | 34 | 408 | 43 | — | Example |
| 10 | 861 | 76 | 70 | 216 | 21 | 432 | 36 | 540 | Example |
| 11 | 845 | 95 | 59 | 218 | 13 | 410 | 40 | — | Example |
| 7 | 836 | 113 | 44 | 229 | 28 | 397 | 52 | 540 | Example |

TABLE 2-continued

| | | | | | | | | | |
|---|---|---|---|---|---|---|---|---|---|
| 10 | 852 | 90 | 67 | 229 | 30 | 379 | 41 | — | Example |
| 7 | 849 | 114 | 60 | 237 | 25 | 308 | 42 | 510 | Example |
| 18 | 841 | 95 | 55 | 254 | 23 | 363 | 65 | 540 | Comparative Example |
| 14 | 839 | 141 | 55 | 210 | 29 | 438 | 53 | 500 | Comparative Example |
| 9 | 833 | 86 | 50 | 213 | 13 | 430 | 40 | 510 | Comparative Example |
| 15 | 841 | 166 | 49 | 203 | 35 | 361 | 59 | 510 | Comparative Example |
| 19 | 853 | 81 | 67 | 205 | 11 | 418 | 52 | 520 | Comparative Example |
| 15 | 856 | 65 | 46 | 207 | 8 | 431 | 34 | 510 | Comparative Example |
| 6 | 863 | 164 | 67 | 207 | 29 | 402 | 37 | 530 | Comparative Example |
| 9 | 862 | 93 | 62 | 241 | 31 | 426 | 58 | 540 | Example |
| 11 | 854 | 73 | 52 | 243 | 35 | 386 | 43 | 520 | Comparative Example |

*1) [(finishing temperature)-700° C.]/(elapsed time for cooling to 700° C. from start of forced cooling)
*2) average cooling rate from 700° C. to coiling temperature: [700° C.-(coiling temperature)]/(elapsed time for cooling to coiling temperature from 700° C.)
*3) average cooling rate from end of heating at ($Ac_3$-50)° C. or higher and ($Ac_3$-10)° C. or lower to 550° C. [(annealing temperature)-550° C.]/(elapsed time for cooling to 550° C. from start of cooling)
*4) average heating rate in temperature range of 500° C. or higher and ($Ac_3$-120)° C. or lower during heating to ($Ac_3$-50)° C. or higher and ($Ac_3$-10)° C. or lower
*5) retention time at Ms-150° C. or lower
*6) retention time at 200° C. or higher and 440° C. or lower
*7) retention time after cooling from finish rolling temperature to 700° C. at average cooling rate of 30° C./s or more

TABLE 3

| | | Steel sheet microstructure | | | | | Steel sheet mechanical properties | | | | | | |
|---|---|---|---|---|---|---|---|---|---|---|---|---|---|
| | | Ferrite | | | Interface length of | Other | | | | | | | |
| Steel sheet No. | Surface state | average grain size (μm) | Ferrite area ratio (%) | Tempered martensite area ratio (%) | untampered martensite (× $10^{10}$ μm/m²) *1 | metal micro-structure *2 | Yield strength (MPa) | Tensile strength (MPa) | Total elong-ation (%) | Bend-ability at R/t = 1.0 *3 | Bend-ability at R/t = 1.4 *4 | Bend-ability eval-uation | Coating property eval-uation | Note |
| 1 | GI material | 0.7 | 10 | 88 | 7.8 | Retained γ | 749 | 998 | 13 | O | O | good | good | Example |
| 2 | GA material | 0.7 | 7 | 89 | 3.0 | Retained γ | 832 | 1003 | 12 | O | O | good | good | Example |
| 3 | GA material | 2.1 | 3 | 95 | 4.2 | Retained γ | 702 | 1003 | 12 | X | X | poor | good | Comparative Example |
| 4 | GA material | 1.8 | 2 | 93 | 7.2 | Retained γ | 731 | 1030 | 12 | X | X | poor | good | Comparative Example |
| 5 | GA material | 0.8 | 6 | 90 | 580.1 | Retained γ | 818 | 1010 | 13 | X | X | poor | good | Comparative Example |
| 6 | GA material | 0.6 | 5 | 90 | 519.7 | Retained γ | 760 | 1013 | 13 | X | X | poor | good | Comparative Example |
| 7 | GA material | 1.3 | 12 | 86 | 4.9 | Retained γ | 839 | 1011 | 12 | X | O | good | good | Example |
| 8 | GA material | — | 0 | 76 | 1.5 × $10^2$ | Retained γ | 923 | 1073 | 12 | X | X | poor | good | Comparative Example |
| 9 | GA material | 0.5 | 9 | 87 | 115.3 | Retained γ | 761 | 1001 | 13 | X | X | poor | good | Comparative Example |
| 10 | GA material | 1.4 | 11 | 85 | 5.3 | Retained γ | 808 | 997 | 13 | X | O | good | good | Example |
| 11 | GA material | 3.6 | 25 | 72 | 11.9 | Retained γ | 608 | 869 | 15 | X | X | poor | good | Comparative Example |
| 12 | GA material | 1.0 | 6 | 51 | 686.0 | B + Retained γ | 1051 | 1251 | 8 | X | X | poor | good | Comparative Example |
| 13 | GA material | 0.9 | 3 | 71 | 533.6 | Retained γ | 925 | 1186 | 11 | X | X | poor | good | Comparative Example |
| 14 | GI material | 1.2 | 6 | 92 | 8.9 | Retained γ | 807 | 1034 | 12 | O | O | good | good | Example |

TABLE 3-continued

| Steel sheet No. | Surface state | Ferrite average grain size (μm) | Ferrite area ratio (%) | Tempered martensite area ratio (%) | Interface length of untampered martensite (× 10¹⁰ μm/m²) *1 | Other metal microstructure *2 | Yield strength (MPa) | Tensile strength (MPa) | Total elongation (%) | Bendability at R/t = 1.0 *3 | Bendability at R/t = 1.4 *4 | Bendability evaluation | Coating property evaluation | Note |
|---|---|---|---|---|---|---|---|---|---|---|---|---|---|---|
| 15 | GA material | 1.1 | 9 | 89 | 9.5 | Retained γ | 746 | 994 | 12 | O | O | good | good | Example |
| 16 | GI material | 0.8 | 8 | 87 | 3.3 | Retained γ | 820 | 1000 | 12 | O | O | good | good | Example |
| 17 | GA material | 0.6 | 7 | 89 | 11.8 | Retained γ | 852 | 1026 | 12 | O | O | good | good | Example |
| 18 | GI material | 1.2 | 8 | 87 | 12.5 | Retained γ | 743 | 990 | 13 | O | O | good | good | Example |
| 19 | GA material | 0.6 | 5 | 91 | 4.1 | Retained γ | 773 | 1031 | 11 | O | O | good | good | Example |
| 20 | GI material | 1.2 | 5 | 93 | 10.8 | Retained γ | 831 | 1026 | 11 | O | O | good | good | Example |
| 21 | GA material | 1.0 | 9 | 88 | 10.3 | Retained γ | 779 | 1012 | 12 | O | O | good | good | Example |
| 22 | GI material | 1.1 | 5 | 90 | 6.7 | Retained γ | 819 | 1063 | 11 | O | O | good | good | Example |
| 23 | GA material | 0.9 | 7 | 91 | 2.4 | Retained γ | 891 | 1073 | 12 | O | O | good | good | Example |
| 24 | GI material | 0.5 | 10 | 88 | 6.0 | Retained γ | 807 | 1034 | 12 | O | O | good | good | Example |
| 25 | GA material | 1.1 | 2 | 96 | 4.0 | Retained γ | 788 | 1050 | 12 | O | O | good | good | Example |
| 26 | GA material | 0.9 | 4 | 91 | 8.5 | Retained γ | 669 | 955 | 13 | O | O | good | good | Comparative Example |
| 27 | GA material | 0.8 | 3 | 94 | 483.1 | Retained γ | 960 | 1215 | 11 | X | X | poor | good | Comparative Example |
| 28 | GA material | 1.2 | 1 | 94 | 6.8 | Retained γ | 746 | 981 | 12 | X | X | poor | good | Comparative Example |
| 29 | GA material | 3.4 | 18 | 80 | 7.3 | Retained γ | 688 | 969 | 12 | X | X | poor | good | Comparative Example |
| 30 | GA material | 3.1 | 25 | 71 | 7.8 | Retained γ | 678 | 955 | 13 | X | X | poor | good | Comparative Example |
| 31 | GA material | 3.8 | 26 | 70 | 6.3 | Retained γ | 665 | 950 | 13 | O | O | good | poor | Comparative Example |
| 32 | GA material | 1.0 | 9 | 87 | 546.1 | Retained γ | 867 | 1156 | 11 | X | X | poor | good | Comparative Example |
| 33 | GA material | 0.5 | 7 | 91 | 13.1 | Retained γ | 814 | 1031 | 11 | O | O | good | poor | Example |
| 34 | GA material | 3.8 | 6 | 89 | 201.1 | Retained γ | 860 | 1036 | 12 | X | X | poor | good | Comparative Example |

*1) total length per unit area of interface between untempered martensite phase and ferrite phase and interface between untempered martensite phase and tempered martensite phase
*2) metal microstructure other than ferrite, untempered martensite, and tempered martensite
*3) cracking evaluation result after bending at R/t = 1.0
*4) cracking evaluation result after bending at R/t = 1.4

The invention claimed is:

1. A high-strength steel sheet having a component composition containing, in mass %,
C: 0.07 to 0.14%,
Si: 0.65 to 1.65%,
Mn: 1.8 to 2.6%,
P: 0.05% or less,
S: 0.005% or less,
Al: 0.08% or less,
N: 0.0060% or less,
Ti: 0.005 to 0.030%,
B: 0.0002 to 0.0030%, and
either or both of Cr: 0.01 to 0.40% and Mo: 0.01 to 0.50%, with the balance being Fe and incidental impurities, and Expression (1) being satisfied, wherein:
an average grain size of a ferrite phase is 1.5 μm or less; an area ratio of the ferrite phase is 2% or more and 15% or less; an area ratio of a tempered martensite phase is 75% or more and 96% or less; and a total length per unit area of an interface between an untempered martensite phase and the ferrite phase and an interface between the untempered martensite phase and the tempered martensite phase is $6.3 \times 10^8$ μm/m² or more and $5.0 \times 10^{11}$ μm/m² or less;

$$\frac{[\% \ Cr] + 2.6[\% \ Mo]}{[\% \ C]} \geq 2.0 \qquad (1)$$

wherein [% M] (M=Cr, Mo, C) represents content of each element in mass %.

2. The high-strength steel sheet according to claim 1, wherein the component composition further contains, in mass %, one or two or more selected from
V: 0.001 to 0.3%,
Cu: 0.001 to 0.1%, and
Ni: 0.001 to 0.2%.

3. The high-strength steel sheet according to claim 1, wherein a hot-dip coating layer is included on a surface.

4. The high-strength steel sheet according to claim 2, wherein a hot-dip coating layer is included on a surface.

5. The high-strength steel sheet according to claim 3, wherein the hot-dip coating layer has a component composition containing, in mass %, Fe: 5.0 to 20.0%, Al: 0.001 to 1.0%, and one or two or more selected from Pb, Sb, Si, Sn, Mg, Mn, Ni, Cr, Co, Ca, Cu, Li, Ti, Be, Bi, and REM: 0 to 3.5% in total, with the balance being Zn and incidental impurities.

6. The high-strength steel sheet according to claim 4, wherein the hot-dip coating layer has a component composition containing, in mass %, Fe: 5.0 to 20.0%, Al: 0.001 to 1.0%, and one or two or more selected from Pb, Sb, Si, Sn, Mg, Mn, Ni, Cr, Co, Ca, Cu, Li, Ti, Be, Bi, and REM: 0 to 3.5% in total, with the balance being Zn and incidental impurities.

7. The high-strength steel sheet according to claim 3, wherein the hot-dip coating layer is an alloyed hot-dip layer.

8. The high-strength steel sheet according to claim 4, wherein the hot-dip coating layer is an alloyed hot-dip layer.

9. The high-strength steel sheet according to claim 5, wherein the hot-dip coating layer is an alloyed hot-dip layer.

10. The high-strength steel sheet according to claim 6, wherein the hot-dip coating layer is an alloyed hot-dip layer.

11. A method of manufacturing a high-strength steel sheet, comprising:
a hot rolling process including heating of steel having the component composition according to claim 9 at 1,100° C. or higher and 1,300° C. or lower,
hot rolling at a finish rolling temperature of 820° C. or higher,
starting cooling within 3 seconds after completing finish rolling, cooling at an average cooling rate of 30° C/s or more and less than 80° C/s from the finish rolling temperature to 700° C. and then at an average cooling rate of 10° C/s or less to a coiling temperature, and coiling at a coiling temperature of 580° C. or higher and 680° C. or lower;
a cold rolling process after the hot rolling process; and
an annealing process including:
heating to $(Ac_3-50)°$ C. or higher and $(Ac_3-10)°$ C. or lower at an average heating rate of 4.5° C/s or more in a temperature range of 500° C. or higher and $(Ac_3-120)°$ C. or lower and cooling to $(Ms-150)°$ C. or lower,
followed by retaining in a temperature range of 200° C. or higher and 440° C. or lower for 15 seconds or more after the cold rolling process.

12. The method according to claim 11, further comprising a hot-dip coating process including reheating to 450° C. or higher and 600° C. or lower after the annealing process, followed by hot-dip coating.

13. The method according to claim 12, wherein the hot-dip coating process further includes alloying processing after the hot-dip coating.

14. A method of manufacturing a high-strength steel sheet, comprising:
a hot rolling process including heating of steel having the component composition according to claim 10 at 1,100° C. or higher and 1,300° C. or lower, hot rolling at a finish rolling temperature of 820° C. or higher, starting cooling within 3 seconds after completing finish rolling, cooling at an average cooling rate of 30° C/s or more and less than 80° C/s from the finish rolling temperature to 700° C. and then at an average cooling rate of 10° C/s or less to a coiling temperature, and coiling at a coiling temperature of 580° C. or higher and 680° C. or lower;
a cold rolling process after the hot rolling process; and
an annealing process including heating to $(Ac_3-50)°$ C. or higher and $(Ac_3-10)°$ C. or lower at an average heating rate of 4.5° C/s or more in a temperature range of 500° C. or higher and $(Ac_3-120)°$ C. or lower and cooling to $(Ms-150)°$ C. or lower, followed by retaining in a temperature range of 200° C. or higher and 440° C. or lower for 15 seconds or more after the cold rolling process.

15. The method according to claim 14, further comprising a hot-dip coating process including reheating to 450° C. or higher and 600° C. or lower after the annealing process, followed by hot-dip coating.

16. The method according to claim 15, wherein the hot-dip coating process further includes alloying processing after the hot-dip coating.

* * * * *